UNITED STATES PATENT OFFICE.

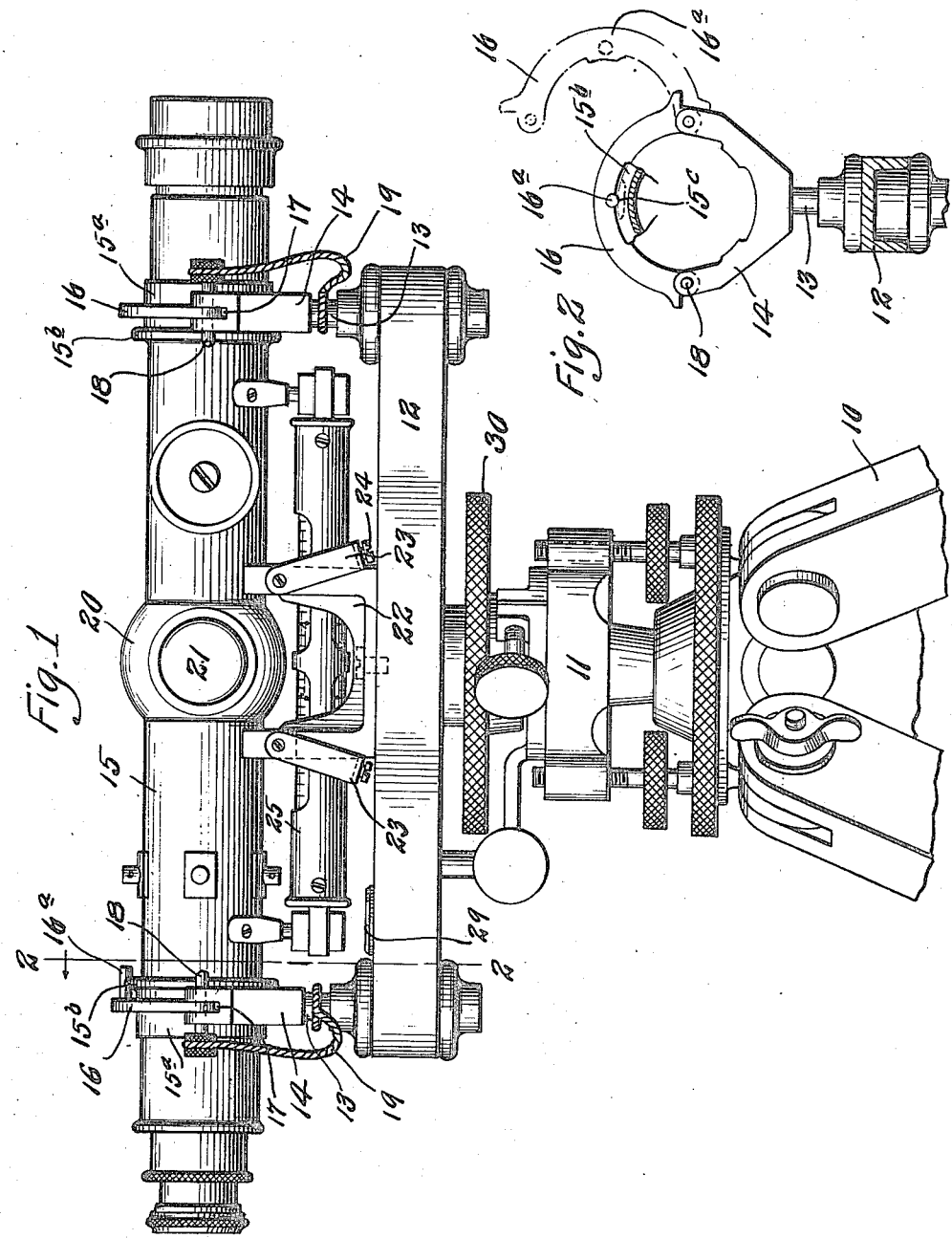

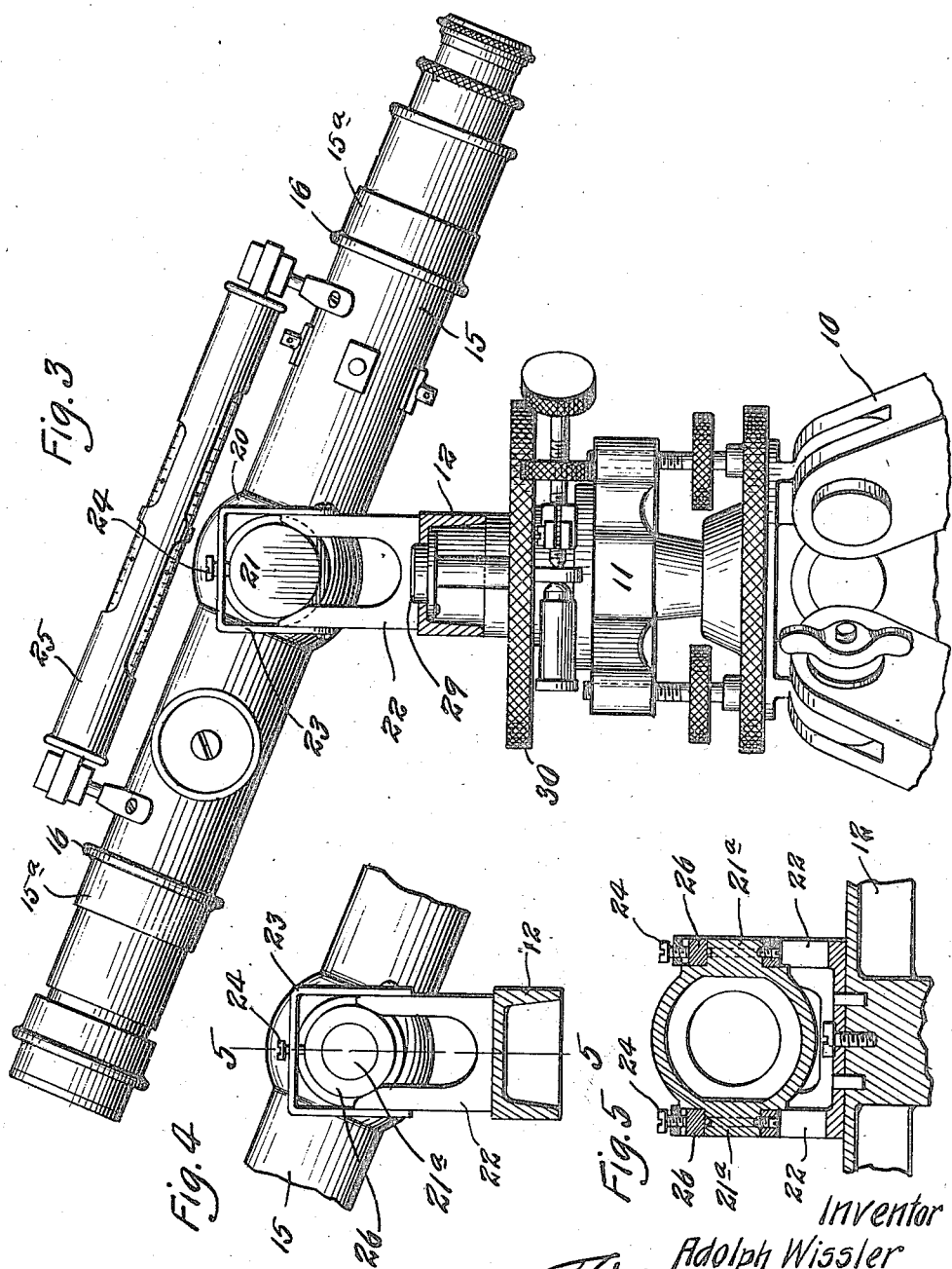

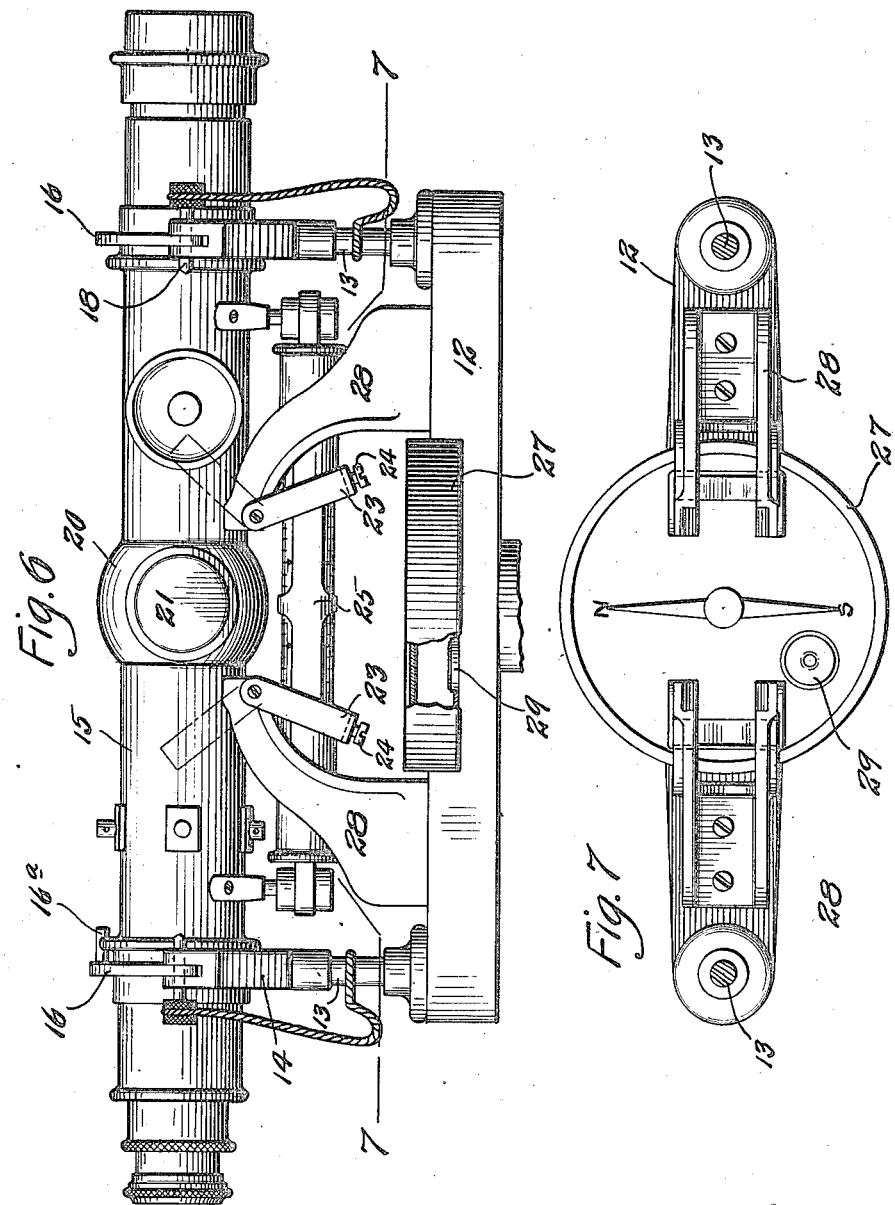

ADOLPH WISSLER, OF ST. LOUIS, MISSOURI.

COMBINATION LEVEL AND TRANSIT.

1,234,520.  Specification of Letters Patent.  Patented July 24, 1917.

Application filed July 12, 1915. Serial No. 39,424.

*To all whom it may concern:*

Be it known that I, ADOLPH WISSLER, a citizen of the United States, residing at St. Louis, Missouri, have invented a certain new and useful Improvement in Combination Levels and Transits, of which the following is a full, clear, and exact description, such as will enable others skilled in the art to which it appertains to make and use the same, reference being had to the accompanying drawings, forming part of this specification.

My invention relates generally to a surveying instrument and more particularly to a combination level and transit, the principal object of my invention being to provide a comparatively simple and easily adjusted instrument wherein the telescope necessary to both level and transit is removably and adjustably positioned upon suitable supports so that without material change of construction and without the addition of parts, it can be interchangeably used in serving the purpose of either level or transit.

A further object of my invention is to provide readily releasable and adjustable supports for the telescope whereby the latter will be firmly held in proper position when the instrument is utilized as a level and certain of said supports maintaining the telescope in proper position and permitting it to be swung through a vertical plane when the instrument is utilized as a transit.

I am aware that heretofore certain types of combination instruments employing an interchangeable telescope have been produced, but in these instruments the supports for the telescope are constructed so that considerable time is required in shifting the telescope from one position to another, owing to the fact that the telescope is fitted with removable parts usually in the form of trunnions which must be removed and replaced each time the telescope is shifted. Furthermore, the use of detachable trunnions or the like on the telescope frequently results in inaccuracy of alinement of said telescope when the same is repositioned upon its supports, and I propose to overcome these objectionable features by equipping the telescope with fixed trunnions and to arrange on a part of the body of the instrument, preferably the cross bar, suitable supports for said trunnions and for the telescope, all of which supports are arranged and constructed so as to firmly hold said telescope in proper position.

With the foregoing and other objects in view, my invention consists in certain novel features of construction and arrangement of parts, hereinafter more fully described, claimed and illustrated in the accompanying drawings, in which—

Figure 1 is a side elevational view of an instrument of my improved construction with the parts arranged to serve as a level.

Fig. 2 is a cross sectional view taken approximately on the line 2—2 of Fig. 1, with the telescope broken away.

Fig. 3 is a side elevational view of the instrument with the parts arranged to serve as a transit.

Fig. 4 is a side elevational view of a portion of the telescope and one of the supports thereof and showing a modified form of the trunnion utilized when the instrument is used as a transit.

Fig. 5 is a vertical section taken approximately on the line 5—5 of Fig. 4.

Fig. 6 is a side elevational view of a modified form of the instrument with the parts in position to serve as a level and showing a compass associated with the cross bar.

Fig. 7 is a horizontal section taken approximately on the line 7—7 of Fig. 1.

Referring in detail to the construction of the instrument illustrated in Figs. 1, 2 and 3, 10 designates the usual tripod which supports the usual frame work 11 and surmounting the latter is the usual cross bar 12. Arranged upon this cross bar at or near its ends are posts 13 which are surmounted by substantially Y or U-shaped members 14, the same being termed "wyes" by manufacturers and users of this class of instruments. These wyes serve as seats for the telescope 15 when the latter is positioned so that the instrument is used as a level.

Hinged to the upper ends of corresponding arms of the wyes 14 are substantially inverted U-shaped clips or keepers 16 which overlie the telescope when the latter is positioned on the wyes and the opposite ends of these clips are adapted to engage in recesses 17 formed in the upper ends of the arms of the wyes 14 opposite the arms to which the clips are hinged. Formed through the wyes to the sides of these recesses and through the ends of the clips which occupy said recesses are apertures which are adapted to receive pins 18. These pins are preferably carried by short chains or cables 19, which latter are secured to the corresponding posts 13, said pins serving to lock the free ends of the clips 16 to the wyes 14 and consequently maintaining the telescope in rigid position when the instrument is being used as a level.

The body of the telescope 15 is preferably provided with sleeves or collars 15ª which rest in the wyes 14 and are engaged by the clips 16, and formed at the end of one of these collars is a flange 15ᵇ in which is formed a notch 15ᶜ. This notch is adapted to be engaged by a pin 16ª, the same projecting horizontally from one of the clips 16, and thus the telescope is centered or maintained in proper relative position when arranged on the supports for use as a level and the vertical wire within the telescope is maintained in true perpendicular or plumb position.

Formed integral with or fixed to the central portion of the body of the telescope is a collar 20 and projecting outwardly therefrom is a pair of oppositely disposed trunnions 21.

Formed on or fixed to the central portion of cross bar 12 at points near and equi-distant from the center thereof are upwardly projecting substantially U-shaped wyes or supports 22, the upper portions of which are adapted to receive the trunnions 21 when the telescope is applied to the instrument for use as a transit.

Pivotally connected to the upper portions of the supports or wyes 22 are bail-shaped clips 23 which are swung upward into position above the trunnions 21 when the latter are positioned in the wyes 22, thus serving to retain said trunnions in their seats, and to lock them in this position, the upper portions of the bails are provided with set screws 24, the points of which are adapted to bear on the peripheries of said trunnions.

When the instrument is in use as a level and the telescope is positioned in the wyes 14, the clips or keepers 23 are swung downward against the lower portions of the wyes 22. (See Fig. 1.)

Where the telescope 15 is equipped with a spirit level such as 25, it is essential that the wyes 22 be of sufficient depth to accommodate said spirit level when the telescope is positioned upon the wyes 14, as seen in Fig. 1.

The tube or housing which incloses the spirit level 25 is open both top and bottom in order that said level can be used in taking levels when the telescope is in position for use as a transit.

Where the telescope is arranged on the instrument so that the same can be used as a transit, the pins 18 are removed and the keepers 16 are swung upward to permit the removal of the telescope without disturbing its adjustments from the wyes 14, and said telescope is now turned into a position at right angles to the cross bar 12 and the trunnions 21 are arranged on their seats at the upper ends of the wyes 22.

The bail-shaped clips 23 are now swung upward into position above the trunnions and the set screws 24 are tightened so that their points frictionally engage the peripheries of said trunnions.

It will be understood that when the telescope is arranged for transit use, it is applied to the wyes 22 so that the level 25 is uppermost, as seen in Fig. 3.

In the modified construction illustrated in Figs. 4 and 5, the trunnions 21ª on the telescope are provided with loosely arranged bearing rings 26, the same being adapted to rest on the seats of the wyes 22 and this construction permits the set screws 24 to be tightened against said rings without interfering with the free vertical swinging movement of the telescope.

In Figs. 6 and 7 I have illustrated an instrument particularly adapted for surveyors' use and which instrument includes a plain or fixed compass 27, or a compass for setting off the magnetic variations or declination of a compass needle, said compass being centrally located on the cross bar 12 and the wyes 28 for the trunnions of the telescope extend upwardly and inwardly from points on said cross bar to the sides of said compass.

In some instances it may be found desirable to arrange in the lower portion of the compass case an ordinary watch level 29 and likewise one of said watch levels may be located in the cross bar 12, as illustrated in Fig. 1, thus enabling the user of the instrument to readily observe any variation from true position of the instrument while making the change from level to transit, or vice versa.

The supports or wyes in which the telescope rest when the instrument is used as a transit, are arranged or centered in such a manner as to be absolutely true or central with the center of the instrument, thus permitting of the taking of absolutely true and correct angles from the graduated circle 30 with vernier attachment and which latter is located immediately beneath the bar 12. This graduated circle has a vernier reading to angles of five minutes of arc and enables a surveyor or builder to take back and foresights when running long lines of leveling and which result can be readily accomplished by merely lifting the telescope out of its bearings and reversing its position.

An instrument of my improved construction is comparatively simple, is particularly adapted for the requirements of civil engineers, surveyors, architects, and builders and the telescope forming an essential part of the instrument can be easily and quickly shifted from one position to the other and the supports for said telescope are provided with means which engage and hold said telescope in proper operative position.

It will be readily understood that minor changes in the size, form and construction of the various parts of my improved instrument can be made and substituted for those herein shown and described, without departing from the spirit of my invention, the scope of which is set forth in the appended claims.

I claim:

1. In an instrument of the class described, the combination with a telescope having trunnions, of pairs of supports, one pair being adapted to receive said telescope and maintain it in a horizontal position and the other pair being adapted to receive the trunnions on said telescope and to permit the latter to be swung through a vertical plane.

2. In an instrument of the class described, the combination with a telescope having trunnions, of pairs of supports, one pair being adapted to receive said telescope and maintain it in a horizontal position and the other pair being adapted to receive the trunnions on said telescope and to permit the latter to be swung through a vertical plane, means on the first mentioned pair of supports for engaging and holding the telescope in position on said supports, and means on the second mentioned pair of supports for engaging and retaining the trunnions on said second mentioned pair of supports.

3. In an instrument of the class described, a base, a telescope, means on the base for engaging and supporting the telescope in position substantially parallel with the base, and means on the base and telescope for supporting the latter in position substantially at right angles to the base and to permit said telescope to be swung through a vertical plane.

4. In an instrument of the class described, the combination with a base, of supports near the ends of said base, a telescope adapted to rest in said supports, readily releasable keepers coöperating with said supports to retain the telescope in position, trunnions on the telescope near its center, spaced supports near the center of the base for said trunnions, and readily releasable means coöperating with the last mentioned supports for engaging said trunnions.

5. In an instrument of the class described, a base, a pair of supports thereon, a telescope adapted to rest in said supports, a flange on said telescope, in which flange is formed a notch, readily releasable means coöperating with the supports to engage and hold the telescope in proper position on the base, and a projection on the releasable means of one support for engaging in the notch in the flange on the telescope for holding the same against rotary movement when positioned on said supports.

6. In an instrument of the class described, a base, pairs of supports thereon, a telescope adapted to rest in one pair of the supports, and means on the telescope for engaging in the other pair of supports.

7. In an instrument of the class described, a base, pairs of supports thereon, a telescope adapted to rest in one pair of the supports, means on the telescope for engaging the other pair of supports, and means for securing said telescope in operative position on said supports.

8. In an instrument of the class described, a base, pairs of supports thereon, the members of one pair being arranged outside the members of the other pair, and a telescope adapted to rest in either pair of the supports.

9. In an instrument of the class described, a base, pairs of fixed supports thereon, a telescope adapted to rest in one pair of said fixed supports, and fixed means on the telescope for engaging in the other pair of fixed supports.

10. In an instrument of the class described, a base, pairs of fixed supports thereon, a telescope adapted to rest in one pair of said fixed supports, fixed means on the telescope for engaging in the other pair of fixed supports, and means for holding said telescope in position on either pair of fixed supports.

11. In an instrument of the class described, a base, pairs of supports thereon, the members of one pair being arranged outside the members of the other pair, a telescope, the body of which is adapted to rest in one pair of the supports, and means on said telescope for engaging in the other pair of supports.

12. In an instrument of the class described, the combination with a telescope having trunnions, of a base provided with supports adapted to receive said trunnions, and with supports adapted to receive the body of the telescope.

13. In an instrument of the class described, the combination with a telescope having laterally projecting trunnions, of a base provided with two pairs of supports, the members of one pair being arranged outside the other, all of said supports being in substantial alinement on the base, the supports of the outer pair being adapted to receive the body of the telescope and the inner pair of said supports being adapted to receive the trunnions on said telescope.

14. In an instrument of the class described, the combination with a telescope having laterally projecting trunnions, of a base provided with two pairs of supports, the members of one pair being arranged outside the other, all of said supports being in substantial alinement on the base, the supports of the outer pair being adapted to receive the body of the telescope and the inner pair of said supports being adapted to receive the trunnions on said telescope, and means for retaining the telescope in operative position on each pair of supports.

15. In an instrument of the class described, the combination with a telescope having trunnions, of a base, supports thereon for receiving the telescope and retaining the same in one position, and supports on said base for receiving the trunnions and holding the telescope in operative position substantially at right angles to its position on the first mentioned supports.

In testimony whereof I hereunto affix my signature this 8th day of July, 1915.

ADOLPH WISSLER.